United States Patent

Goldmann

[15] 3,640,696

[45] Feb. 8, 1972

[54] SOIL CONDITIONER AND GARDEN MOLD ON THE BASIS OF COFFEE EXTRACTION RESIDUE

[72] Inventor: Gerhard Goldmann, Buchschlag, Germany

[73] Assignee: Deutsche Gold- und Silber-Scheideanstalt vormals Roessler, Frankfurt am Main, Germany

[22] Filed: Oct. 9, 1969

[21] Appl. No.: 865,146

[30] Foreign Application Priority Data

Oct. 15, 1968 Germany .................. P 18 03 103.3
June 9, 1969 Germany .................. P 19 29 195.3

[52] U.S. Cl. ........................... 71/9, 71/25, 71/27, 71/62
[51] Int. Cl. ........................... C05f 11/08
[58] Field of Search .................. 47/1.1; 71/23, 24, 25, 26, 71/8, 9, 64 SC, 62, 5

[56] References Cited

UNITED STATES PATENTS

| | | | |
|---|---|---|---|
| 2,877,599 | 3/1959 | Hebestreet et al. | 71/24 X |
| 3,177,615 | 4/1965 | Rowe | 71/23 X |
| 1,917,734 | 7/1933 | Rewald | 71/23 X |
| 2,171,908 | 8/1939 | Smit | 71/24 X |
| 2,780,031 | 2/1957 | Bryant | 71/62 X |
| 3,130,038 | 5/1964 | Thomas et al. | 71/62 X |
| 3,159,477 | 12/1964 | Wilson | 71/62 |
| 3,138,447 | 6/1964 | Eweson | 71/9 |
| 3,235,369 | 2/1966 | Eweson | 71/9 |
| 1,439,188 | 12/1922 | Poock | 71/8 |
| 2,049,889 | 8/1936 | Boniface | 71/9 |
| 2,867,521 | 1/1959 | Jeffreys | 71/9 X |

FOREIGN PATENTS OR APPLICATIONS

| | | | |
|---|---|---|---|
| 1,082,603 | 6/1960 | Germany | 71/23 |
| 616,213 | 3/1961 | Canada | 71/9 |

OTHER PUBLICATIONS

A Slowly Soluble Source of Micro nutrients for Plants, Rhodes et al., from Soil Science, May 1956, pp. 359–369

Primary Examiner—Reuben Friedman
Assistant Examiner—Richard Barnes
Attorney—Michael S. Striker

[57] ABSTRACT

The soil conditioner comprises a decomposed organic waste product, preferably coffee grounds, in the form of the extraction residue arising in the industrial production of powdered coffee, together with finely divided natural or synthetic activated silicon dioxide or a material containing the same.

The material is made by subjecting the coffee ground extraction residue to fermentation in a closed tank and then adding the silicon dioxide followed by storage upon access to the open air. The silicon dioxide may also be added prior to placing the material in the fermentation tank.

18 Claims, 3 Drawing Figures

Fig. 3

SOIL CONDITIONER AND GARDEN MOLD ON THE BASIS OF COFFEE EXTRACTION RESIDUE

BACKGROUND OF THE INVENTION

The invention relates to a soil conditioner which is also useful as a garden mold and which is based on natural organic materials, preferably the extraction residue obtained in the manufacture of powdered coffee, and is in a fermented decomposed condition.

The productivity of agriculturally useful plants has since olden times been increased by employing mineral fertilizers which provide the plants with nutrients, for instance by means of natural fertilizer or mineral fertilizers such as potassium salts, nitrogen compounds and phosphates. These fertilizers, however, result only in an increase of the productivity for a limited period but do not in general accomplish a direct and adequate soil improvement since the mineral salts are used up in the plant development each year.

For their optimum development, plants require a sufficient supply of mineral nutrients. These vital nutrients consist predominantly both of the so-called essential elements, K, N, S, as well as the so-called trace elements Cu, Mn, Fe, Mo, Zn. An ideal plant growth requires that all of these nutrients are adequately available during the entire vegetation period in a form that can be resorbed by the plant.

These optimum conditions frequently cannot be realized in actual practice since, on the one hand, many nutrients, because of the small solubility of their derivatives, cannot be dissolved in an adequate amount from the soil by water and therefore cannot be made available to the plant which can absorb only dissolved materials while, on the other hand, materials of high solubility are subject to premature washing out by large amounts of precipitation.

In order to reduce the washing out by atmospheric precipitation in case of commercial nitrogen fertilizers, condensation products of low solubility of urea and aldehyde have been used as slow acting fertilizer. The nitrogen content of these products is about 25 to 40 percent by weight. These extended action nitrogen fertilizers are without any effect on the supply of the trace elements to the plant.

On the other hand it has been proposed to supply the plant with the trace elements which are present in the soil in a form of low solubility by adding complex forming agents to the soil. Such agents are, for instance, aminopolycarboxylic acids such as ethylenediaminetetra-acetic acid, polyalkylenediaminotetraacetic acid and tetrapropionic acid, nitrilotriacetic acid, diethylenetriaminepenta-acetic acid, hydroxyethylenediaminotriacetic acid, cyclohexane 1,2-diaminotetraacetic acid and alkyl-substituted iminodicarboxylic acids, etc. These aminopolycarboxylic acids, which are well known in analytical chemistry as strong chelate complex forming agents, can open up compounds of low solubility such as phosphates, carbonates, oxides, etc., and convert them into soluble form. Thus, soluble compounds of the trace elements are placed at the disposal of the plant. The opening up and decomposition of the natural phosphates of low solubility, such as iron or manganese phosphate, supplies the plant both with the trace elements iron and manganese, as well as with the essential element phosphorus. However, the action of the chelate-forming aminopolycarboxylic acids is limited since they are subject to degradation by bacteria in the soil. It is therefore necessary to carry out the addition of the complex forming agents at repeated times during one vegetation period.

According to a rather old proposition, the chelate-forming action can be prolonged and the materials that are present in the soil in insoluble form can be provided in optimal amounts by continuously converting the compounds in soluble form by feeding the plant additionally and continuously with nitrogen compounds which can be resorbed and which result in aminopolycarboxylic acid nitriles in the soil.

There is thus obtained a particularly desirable supply of the plant during the vegetation period, both with nitrogen and with the trace elements. The action of the natural humidity in the soil causes a slow hydrolysis of the aminopolycarboxylic acid nitriles to water-soluble ammonium salts of the corresponding acids. The plant thus receives continuously small amounts of ammoniated nitrogen and the essential trace elements which are necessary for the growth of the plant. The trace elements are furnished by conversion of the materials of low solubility into easily soluble compounds by means of the chelate complex forming aminopolycarboxylic acids which are generated during the hydrolysis.

Since the aminopolycarboxylic acid nitriles have a rather low solubility in water, they are only slowly dissolved by rain after application to the soil and supplied to the upper strata of the soil. The danger of a rapid washout, as it occurs with the nitrogen mineral fertilizers that have a high solubility, is thus avoided. The low solubility of the aminopolycarboxylic acid nitriles also prevents the generation of high-percentage solutions in the case of small precipitation amounts, which in case of the fertilizers of high solubility resulted in searing and burns of the plants.

Along with all these problems, there is also the question how to supply the plants not only with the nutrients as such but with the native soil which can be lost by climatic action, such as erosion through rain, wind, etc., and the productivity of which can deteriorate because of continuous agricultural use. The objective thus arises to prevent particularly soil erosion, humus washout and deterioration and blowing away of the soil. Thus, the soil may for instance be mixed with peat to retain the natural humidity and thus the soil particles themselves. This in turn will result in a caking of the soil particles to individual crumbs and will produce a soil reinforcement as this is accomplished, for instance, in the United States by soil conditioner polyacrylates. However, these agents are not very economical when used for large areas, and their field of application is therefore principally in gardening.

Soil conditioners on the basis of organic materials have already been made. Thus, cellulose waste products, particularly wood flour, have been mixed with nitrogen- or sulfur-containing compounds, and the mixture has been used to improve the quality of agricultural soil. These products, however, have the shortcoming that they have no ability to form a friable product and that they are thus merely the carrier material for the nutrients during their slow decomposition.

The proposal has also been made to treat cacao shells with lime, followed by a fermentation (hot fermentation) through a period of months. This process is cumbersome and requires a long time and, because of the thin thickness of the shells, enormous amounts of this material are hardly available in industrial practice.

The German Pat. No. 1,082,603 discloses a soil conditioner and garden mold on the basis of an organic natural material and a process for making the soil condition in which some of the shortcomings pointed out can be avoided. This process uses a material that arises during the production of water-soluble powder coffee, that is both coffee from regular coffee beans and a coffeelike powder from so called ersatz coffee. The initial material used in this method is the extraction residue (coffee grounds) which occurs from the hot extraction of comminuted roasted coffee beans or roasted barley beans, figs and chickory, followed by drying of the extract to a water-soluble powder in a spray drying column or by means of freeze-drying. This extraction material is mixed, according to this patent, with nitrogen- and sulfur-containing inorganic and organic compounds, particularly ammonium sulfate, aqueous ammonia, thiourea, guanidine or urea-containing organic materials to which dilute acetic acid solution or acetates are added. The treatment is effected by subjecting the mass to fermentation in a closed tank, for instance a silo, which fermentation process is then interrupted, followed by drying of the mass and storing in the dark. The mass after this treatment then has the characteristic odor of forest soil.

It must be noted in this connection that these extraction residues from the coffee powder manufacture today are merely waste products in many cases and difficult to handle. In some places they are used as fuel for energy generation or they are stored in large deposits or passed into the sewage. As distinguished from wood flower or cacao shells which largely consist of cellulose, these extraction residues, in addition to 23-24 percent wood fibers, still contain some caffeine, considerable amounts of fats, oils and also sugar, tannic acid, pentosane and mineral materials. Coffee that has been roasted and extracted still results in a dry mass of about the following composition:

| | |
|---|---|
| 20-30% | crude fiber |
| 0-0.5% | sugar |
| about 20% | carbohydrates that can be converted to sugar |
| 10-12% | fat |
| 12-15% | proteins |
| 2-5% | coffee tannins |
| 4-5% | ash |
| 0.5% | caffeine and |
| 20-30% | water | all forming part of the cell structure.

Actually, cacao shells share with coffee grounds only the property that both are waste products. However, cacao shells for decomposition require a long lasting process consisting in a hot fermentation. Coffee beans—and this includes coffee grounds—as definite plant seeds consist only to a minor extent of cellulose and, because of the preceding partial decomposition during the extraction, can be transformed in a comparatively short time. The residue resulting from the extraction of the coffee beans consists of more or less comminuted coffee beans of various sizes of small fragments, sometimes having even the size of half a coffee bean. The structure of the natural fiber is destroyed far less in the industrial extraction processes than in the grinding of coffee beans in eating places or households. The fragments resulting from the extraction therefore still contain, as already indicated, considerable amounts of sugar, convertible carbohydrates, oil, proteins, tannic acid and even caffeine.

As regards the residue of the Ersatz coffee powder manufacture, these are cereal grains which have been subjected to kiln drying and roasting and, in some cases, also roasted figs and chickory. These latter substances after being subjected to the hot steam extraction still contain valuable amino and sugar compounds in addition to the structure-building materials. The size of the individual fragments of these waste products is likewise comparatively large because of the crude grinding which does not destroy too much of the cell structure.

However, even with these processes, there were difficulties caused by the fact that the mere grain size of the residues was an obstacle to a rapid decomposition, resulting in conversion times of hardly less than half a month. The time factor, however, is an important point in forming composts of these waste products since a short time method is necessary in view of the daily accumulation of large amounts of these products.

This same shortcoming of a long conversion time exists also in other prior art processes which involve the transformation of straw, leaves, wood flour, etc., and also the chemical conversion of garbage, the conversion time in these cases being even up to several years. This stands in the way of an industrial compost formation of the large amounts of waste products of organic materials of all kinds which are generated in the various processing industries.

There is also the other problem that many waste products in addition to valuable components also contain poisonous ingredients which heretofore have made it impossible to use them for instance, for garden molds.

Many other proposals have been made to use various materials and wastes to improve the quality of the soil and prevent an increasing deficiency in nutrients, particularly in case of sandy soils and soils of low fertility.

In German published application 1,076,716 the addition of dextrane (polysaccharides) and other water-soluble organic polymers or even water-insoluble polymers have been suggested to improve the properties of clay, mud and sand in order to obtain friable and form-stable soils. However, an improvement of the qualities of the soil in the direction of a buildup of the humus content could not be obtained in this manner. Another proposal, German Pat. No. 868,912, suggests the addition of clay minerals and/or amorphous silicic acid to organic waste products such as barnyard manure, slaughterhouse refuse and sludge from sewage disposal plants, the addition to be made during or after the humidification process. Because of the strong sorptive properties of the mineral additives in regard to the labile humic acids, which otherwise are easily washed out in the soil and lost, an increased stability of the compost can thus be accomplished. However, the decomposition of these waste products takes a long period of time, that is years, and during that time there is a decrease in the activity of the sorptive additives which finally are no longer fully effective. If the mineral materials are added subsequently, a stabilization of the humic acids is accomplished. However, in this case, large amounts of additives are necessary to accomplish the desired effect. Besides, the stabilization through adsorption of the humic acids in the absorbent in this case reaches the point where substantial amounts of additives completely adsorb the comparatively small amounts of humic acids which are present in the waste products and where these humic acids are then unduly slowly released.

It is therefore an object of the present invention to provide for a soil conditioner and a garden mold which can be formed from industrial waste products and which can be transformed into a useful product in a comparatively short period.

Another object is to provide this type of product which also has the ability to absorb large amounts of humidity but will release them only slowly, and preferably only under the action of the adsorption or absorption effected by the subterranean plant portions.

A still further object is to provide a product of the type indicated which has a comparatively high content of humus materials but has ingredients for control or at least partial elimination of the chelating effects of the trace elements present in the humic acids.

A still further object of the invention is to provide for a continuous process for making this type of soil conditioner within a reasonably short time.

A still further object is to make a soil conditioner as stated which is useful for various types of soils and does not require a prior determination of the specific soil composition in order to select a proper conditioner or fertilizer.

SUMMARY OF THE INVENTION

These objects are met by a soil conditioner which is useful also as a garden mold and comprises coffee grounds in the form of the extraction residue arising in the industrial production of powdered coffee or powered coffee substitutes together with a mineral material consisting of finely divided natural or synthetic-activated silicon dioxide or a material containing the same.

The invention also embraces the process for making the soil conditioner by subjecting the coffee extraction residue to fermentation in a closed tank, adding the mineral material to the extraction reside prior to said fermentation or thereafter, and then storing the mass with access to the open air.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The term coffee in connection with the reference to coffee grounds and the coffee extraction residue in the present application is intended to include any type of Ersatz coffee such as cereal beverages made from barley, malt, bran, wheat and molasses, or figs and chickory.

The term "powdered coffee" and similar terms are intended to include the type of beverages now commercially available under the designation "instant coffee."

The soil conditioners of the present invention may in all cases contain nitrogen and/or carbohydrate-containing organic or inorganic materials such as organic waste products, together with or in the form of the special additives previously incorporated in coffee extraction residues as disclosed in German Pat. No. 1,082,603. However, together with these materials, there are added in the invention further additives. These are in the first place a finely divided activated silicon dioxide or a filler material containing the same. Preferably, the compositions of the invention are subjected to a decomposition operation in the form of a fermentation. It is preferred in that case to include in the composition heat storing and/or heat-generating agents in order to generate or maintain the necessary fermentation temperature.

Useful as heat-storing agents are for instance water-insoluble polymers such as phenylethylene polymerization products which may be added as powder or in the form of a foam. These additives are important also for the reason that they will subsequently impart to the soil a permanent friable, but nevertheless firm, consistency.

By virtue of the heat-storing action these additives accomplish also the transformation or destruction of poisonous ingredients that may be present.

Another type of compound that is useful in this connection are urethane polymerization products, which again may be used as powders or in foamed form and which will accomplish the same dual purpose of the phenylethylene polymerization products. The urethane polymers decompose in the course of time and then supply the soil or plant with nitrogen or nitrogen compounds.

The polymerization products can also be foamed right in the semifinished or finished composition which will result in a substantial loosening up of the soil to be treated. Furthermore, this will result in an acceleration of the desired transformation.

As heat-generating agents preferably a mixture or mixtures may be used of charcoal powder, calcium hydroxide or also Chile saltpeter. The charcoal powder may also be omitted in this case since it may be replaced by the well roasted portions of the coffee grounds. These additives, because of their pyrogenic action, support the transformation or conversion of the waste products which occurs when water is added though in case of freshly obtained coffee grounds which have a very high content of water, no further water is necessary. All these additives form valuable components of the final product of the transformation.

Diammonium phosphate may also be added as fermentation salt or yeast cells may be added as obtained from zymase, both of which will effect an acceleration of the fermentation step. Various ferments, particularly amylase (ptyalin, diastase) or organic and/or inorganic acids, may be added to convert the starch component, glycogen component, cellulose, etc., into easily fermented sugars. The crude mass may also be inoculated with cultures of bacteria suited to promote the decomposition.

If ammonium bicarbonate is added to the initial mass prior to the conversion, a softening of the still hard or solid plant fragments occurs, such as exist from the powder coffee extraction where the coffee beans are merely halved. If acids are present a loosening up of the entire mass is effected.

If it is desired to obtain a product which is high in phosphorus, it is preferred to add a phosphoric salt such as sodium-ammonium phosphate.

The extraction residue from the powder coffee manufacture after conversion is characterized by a high content of polymeric humic acids which have the tendency to bind the important space elements Cu, Zn, Fe and Mn by complex formation through chelating. If the planting is effected in soil that is low in trace elements, the result is that the plants can no longer receive the necessary trace elements and deficiency phenomena will appear in the initial period of the growth. The free humic acids are partially adsorbed by the added silicic acid and thus remain in the soil over extended periods up to between 2 and 5 years which accounts for the long term action of this type of overall fertilizer.

However, because of the stabilizing action of the activated highly dispersed silicic acids, a certain portion of the space elements which has already been chelated by the humic acids, will be retained together with these acids and, at least initially, withdrawn from the supply available to the plant. In most cases, this will not result in injury to the plant. However, with soil of extremely poor quality, such as sandy soil, a partial binding of the trace elements may have an undesirable effect on the nutrition of the plant.

It has for instance been observed that with the use of concentrated coffee extraction residues which have merely been subjected to a partial conversion by storing and concomitant putrefaction without complete decay, the result was that all plant growth including, incidentally, the growth of weed ceased. Yet, after about 1 year, an increased growth of plants was noted. However, it should not be the purpose of a fertilizer or soil conditioner to act as herbicide, but the growth-promoting properties should be effective if possible instantaneously.

The soil conditioner of the present invention avoids this herbicide effect if used in not-too-high a concentration and after good mixing with the soil. However, there still remains the problem with this type of product that the exact composition of the soil must be determined regarding pH value and general composition to obtain a first class fertilizer action.

The present invention therefore also has the object, as already indicated, to provide for a fertilizer which is usable for soils of different compositions and does not require a determination of the specific soil composition and pH value.

This is accomplished by the additions of alkali and/or earth alkali metal formates which effect a control of the supply of trace elements.

In addition, and in particular with the use of calcium formate, it is possible to dispense with the conventional hot fermentation of organic waste products such as stable manure, wood wastes, hay or straw during the transformation of the extraction residue from the powder coffee manufacture. This hot fermentation was done to sterilize the humus fertilizer by destroying the germs but it resulted in very high temperatures, high enough that an ignition of the material could occur in the case of dense packing.

The presence of calcium formate, apart from the effect of a control of the release of trace elements during the period of growth, also assures a sterilization of the fertilizer during storing.

Aminopolycarboxylic acids and nitriles thereof can be used instead of calcium formate to obtain the controlled release of trace elements while at the same time releasing nitrogen during extended periods of time. The nitriles of the aminopolycarboxylic acid can be used individually or in combinations of different nitriles.

Aminopolycarboxylic acid nitriles can presently be made from rather inexpensive raw materials. They can in particular be formed by conversion of ammonia or amines with hydrogen cyanide and formaldehyde. Aminopolypropionic nitriles are obtained, for instance, by reaction of ammonia or amines with acrylonitrile.

The combination of the powdered coffee extraction residue with activated finely divided fillers and preferably further water-soluble organic natural or synthetic polymers, as proposed in the invention, effects an optimum stabilization of the fertilizer against both actions arising within the soil and outside in the atmosphere during the period of growth and during the quiescent period. The soil conditioner of the invention furthermore is distinguished by its soil-loosening capacity which is retained even in case of strong atmospheric actions such as heavy rain or wind during long periods of time and, in particular, by an excellent water-retention capacity.

The water-soluble organic natural polymers or synthetic polymers may also be alginic acid polymers or the esters thereof as well as polyvinyl alcohol, polyethyleneimine, polyacrolein, polymethacrylic acid, polyethylene oxide, polyvinylpyrrolidone, polyvinyl-3-methylpyrrolidone, vinylpyrrolidone-vinylacetate copolymers, polyacrylic acid amide and other water-soluble polymerizates. Likewise, polyaddition products and their homologs and water-soluble reaction products may be used. These polymers may be applied in amounts between 0.5 and 3 percent by weight.

In order to improve the resistance of the conditioner against wind and water erosion, it is preferred particularly in case of use in desert areas to include mineral or vegetable oils prior to the conversion or transformation. These oils should be used in amounts between 1 and 20 percent by weight. In order to effect a better intermixture with the extraction residues, the oils may be added prior to the addition of the adsorbents.

The mineral or vegetable oils may either be pure, that is virgin oils, or they may be used oils such as used engine oil, oil from drilling operations, or vegetable oils which are of no further use or animal fats such as occur in roasting places and mass kitchens. Particularly suitable for this purpose are the oil emulsions obtained in the metal industry from metal processing which are in the form of filter cakes consisting of an adsorbent and oil.

These filter cakes which have a high content of oil form a solid residue after breaking up the oil emulsion of the metal process treatment and after adsorption of the oil phase by treatment of the emulsion with a mixture of organic or inorganic adsorbents such as cork powder, wood flour, coffee grounds or diatomaceous earth, bleaching earth, perlite, etc., and a demulsifying agent which may be a strong electrolyte such as constituted by formates or acetates of polyvalent metals which process step is then followed by separation of the oil adsorbent phase from the aqueous phase by means of filtration.

The thus-obtained oil-containing filter cake can be mixed with already converted, that is decomposed, coffee grounds, and the mass can then be subjected again to a decaying operation. However, if coffee grounds are used, the filter cake may also be directly prepared by addition of small amounts of silicic acid.

The waste product which is obtained in the powder coffee production consists of the steam-extracted, roasted and ground coffee beans or roasted cereal grains, figs or chickory with a water content up to 90 percent. This extraction residue in some of the plants has heretofore been used as fuel for generating steam after elimination of the water by a pressing operation to a content of about 50 percent.

However, in view of the continuously increasing consumption in this type of coffee products, larger and larger amounts of coffee residues are available which cannot all be eliminated by using them as fuel and, on the other hand, contain amounts of oils press water so large that the elimination by flushing into the sewage pipes is no longer possible without a serious pollution of the sewage water because of the oil and tannic acid content. The resulting press water from this operation which still contains a substantial amount of coffee oil and tannic acids in emulsified form can be further prepared into an aqueous and oil-containing phase by demulsification and separation. This further treatment is effected with the usual combining splitting and adsorption agents which may for instance be calcium formate and a natural or synthetic silicic acid in hydrophilic or hydrophobic form.

The oil-containing filter cake which results from the filtration may then be treated further like the filter cake resulting from the oil emulsions in the metal industry. All these filter cakes can be used in making the fertilizer of the invention.

There are thus two different approaches to the problem of use of the extraction residues from the powder coffee manufacture. Either the press water may be treated further and the resulting filter cake together with the water-containing coffee residue from the pressing operation may then be subjected to the transformation proposed in this invention. Alternatively, the coffee residue may be directly subjected to the conversion without expelling of the water.

For the direct treatment of the water-containing coffee residue, it is preferred to add to the liquid mass the mineral additives, particularly a wet-precipitated silicic acid, in the beginning of the operation since on account of the hydrophilic properties of the silicic acid the liquid slurry will be converted to a doughlike mass so that the squeezing out of the water is not necessary and the further treatment in a silo is much easier. The conversion in the silo has been found to take effect much faster if the mass is in the form of a doughlike mixture than it does in cases where the initial product is a liquid slurry.

The mineral additives employed in the invention comprise finely divided precipitated wet-produced silicic acids and silicates which, depending on the desired treatment of the soil may be present in the form of alkali and/or earth alkali and/or aluminosilicates. The additives may also be a pyrogenically obtained active oxide of the aluminum and silicon in the form either of individual oxides or a cooxide or in the form of an oxide mixture, that is a mixture of the individual oxides.

Since pure decomposed coffee grounds have a high acidity and generally are useful only for lime soil, it is preferred in that case to use a pure, preferably wet precipitated silicic acid in finely divided form in order to obtain a neutral or faintly acidic product.

For soils which are subject to one-time or continuous intrusions by for instance heating oil seepage or other organic, injurious materials (hydrocarbons, fats, etc.), it is preferred to employ hydrophobic fillers which are available in various forms. The use of hydrophobic fillers is likewise preferred in case of oil-containing materials as described above.

Pyrogenically obtained, finely divided silicic acid is preferred as additive for the preparation of a ready soil from the coffee extraction residue such as can be made up in small packages for specific plants in the flower trade.

The pyrogenic metal oxides or silicon dioxide are obtained from volatile metal or silicon compounds by means of an oxidation or hydrolysis. In case of a flame hydrolysis, a homogeneous mixture is obtained, by reacting from a volatile metal halide such as the chloride in the vapor phase with a gas which forms water upon combustion, oxygen or air and, if desired, an inert gas, the reaction taking place in a flame so as to form the oxide and, for instance, hydrochloric acid. By mixture of different metal halides and feeding of the homogeneous mixture in the vapor phase into a burner, so-called cooxides may be obtained in which each individual primary particle consists already of one, each, of the initial oxides which can not be formed again by either chemical or physical methods. The conjoint coagulation of separately produced oxide aerosols results in inseparable oxide mixtures of the type of the cocoagulates in which each oxide primary particle is united with the primary particle, each, of the other oxide so as to form secondary agglomerates. It is, however, possible also to separately form the oxide aerogels and then mix them mechanically so as to obtain separable mixtures of oxides. The question which individual oxide types to use depends on the properties of the starting products and the final purpose of the product.

The use of X-ray amorphous silicon dioxide for various purposes is well known. This materials has for instance been used as a thickener in the plastics industry, as matting agent in the dyestuff and printing ink industry, as dispersing agent and emulsion stabilizer in the incandescent tube industry for luminescent materials, in the paper industry, in various parts of the chemical industry to make powders pourable, for instance in the food industry to prevent caking of pourable substances and maintain the pourability, as thickening agents for liquids and as tableting aids in the pharmaceutical-cosmetics industry. It has also been used as a filler in the rubber industry, in the oil industry for making solid lubricants, in the floor-surfacing industry to improve the antiskid properties, in connection with heat insulation, etc.

The many uses of finely divided silicic acid have caused numerous investigations of the reasons for the special properties of this material and have resulted in various explanations and interpretations of the thus-obtained results. It appears that the results principally are caused by a physical-chemical interaction. However, all these investigations related principally to technical and chemical products. The use of synthetically obtained silicon dioxide and products containing the same in their effect on the plant growth has hardly ever been considered. The general assumption was that because of its low-solubility $SiO_2$ would not be absorbed or would be absorbed only to an infinitesimal extent by the plants.

It is therefore surprising and unexpected that it has now been found that the plant organism is very well capable of absorbing $SiO_2$ in an action which has not been clarified in detail where such absorption takes place with extraction residues which have been opened up by a fermentation operation. The plants then include the $SiO_2$ as a structure material in their cell organization as will be shown by comparisons furnished below.

The finely divided filler may be used in the invention in a range between about 1 and 10 percent by volume, preferably between 2 and 8 percent relative to the total amount of the waste product to be decomposed. However, depending on the amount of final product and the desired physico-chemical and biological properties, it is also possible to use smaller or larger amounts. In particular cases, the amount may be in the broad range between 0.5 and 30 percent by volume.

The quality of the silicon dioxide used as filler is not critical. It is possible to use also impure silicon dioxide as well as chemically more or less pure materials. However, it is preferred that the powder have a primary particle size of less than 500 m$\mu$, preferably between 3 and 40 m$\mu$ and a specific surface between 100 and 800 m.$^2$/g., preferably between 150 and 200 m.$^2$/g. (measured by the BET method). Chemically pure $SiO_2$ or its cooxide with $Al_2O_3$ may be used in those cases where exact measurements of the growths of the plants are desired.

However, it is also possible to use other types of silicic acids, for instance those that are obtained by other thermal processes, for instance by an arc process or in a plasma burner or by wet chemistry, particularly precipitation. If the use of hydrophobic products is desired, preferably a pure pyrogenic $SiO_2$ is used which, because of chemically attached methyl groups, has hydrophobic properties and has a mean particle size of about 20 m$\mu$, a BET surface of about 100 to 200 m.$^2$/g. The silicon dioxide of this type is intimately mixed with water which results in a "dry" emulsion in which the water particles are enveloped by $SiO_2$ particles to an extent that the pulverulent character of the $SiO_2$ particles is retained. This water carrier composition is particularly useful for admixture to the product which has been predecomposed by fermentation since it will only slowly release its wet contents.

It is, however, also possible to use the less expensive hydrophobized precipitated silicic acids for this purpose.

If activated carbon black is included in the composition, it is possible to prevent the root rot which occurs occasionally. By virtue of carbon black or others of the previously listed fillers, the final product also gains fungicidal and bactericidal properties.

In order to expedite the conversion, it is preferred to add small amounts of iron in pulverulent form or an oxygen-containing compound thereof to the product. The addition can be made either during or after the addition of the finely divided silicic acid or similar mineral fillers.

The use of the powder coffee extraction residue also permits to employ the products of the invention either prior or after further decomposition as a filter material for industrial wastes which may be in the form of liquid, solid or gaseous consistency. This is possible because of the excellent sorption properties of the coffee grounds. It has been found, when using coffee grounds, that both the crude product and, to a still higher extent, the converted, transformed product constitutes an excellent filter for sewage liquids and that, furthermore, this filter material after saturation can then be used as a soil conditioner.

It is also possible to incorporate into the soil conditioner insecticides or herbicides which are slowly released subsequently to the plants or to the environment.

It is also possible to isolate the byproducts which form in the first stage of the anaerobic fermentation such as alcohol or sewer gas and to reuse them, for instance, for the energy supply.

It is also possible, together with the coffee extraction residue, to use extraction residues as are obtained in the pharmaceutical industry by extraction of pharmacologically effective components from herbs. It has been found that the herbs, because of their high cellulose content, are subject to a very slow decay but surprisingly, together with the coffee grounds, they can be converted in a few days to a useful humus concentrate.

The oil cakes which are obtained in the oil recovery industry or other spent residues can also be incorporated with the coffee grounds into excellent soil conditioners or garden molds with the additives as above listed. It is thus also possible to use beech or oak leaves, or other decayable organic materials such as slaughterhouse refuse, horn chippings, tobacco powder, etc., and even the materials that are very difficult to decompose such as fir needles and also fossil organic materials such as lignite or the waste products occurring during lignite mining may be used and are subject to rapid transformation and decomposition when incorporated with the coffee ground.

All this is surprising and unexpected since these fossil organic materials and also the waste materials from the coffee preparation are present in storage depots in large amounts but do not show there any transformation in the direction of a compost formation. A further use of these materials as fertilizers could therefore not be expected.

If the final use of the product is in grass planting on slopes or the cultivation of waste lands, in both of which cases a large amount of humus-containing covering material is necessary, it is possible to use the composition of the invention without further transformation or conversion, which latter will then take place in the soil itself though at a slower rate but still within one growth period. Without the additives of the invention the use of the extraction residue for this purpose would not be possible as already explained.

It is also possible to add to the composition natural lime (calcium carbonate and/or calcium hydroxide or calcium oxide) or calcium phosphates or materials containing the same such as Thomas flour and, furthermore, calcium sulfate. This will accelerate the conversion in the soil and, on the other hand, also makes possible either batchwise or continuous operation when making a fertilizer and soil conditioner for final use.

If a nonconverted crude mixture is used, for instance for the grass planting on slopes, it is preferred to add the above-listed calcium contents, depending on the lime content of the soil, in amounts between 0.1 and 10 percent. For the conversion, either in batch or in continuous operation, it is preferred to make the addition in amounts between 1 and 5 percent.

UTILITY TESTS

The physiological and physical effect of the compositions of the invention in regard to the plant growth (germination, root taking, taking hold in the soil, etc.) is substantial and cannot be accomplished with prior art humus fertilizers.

Comparative tests were carried out with cactus seedlings in three types of soil: (a) commercially available cactus soil; (b) a soil prepared in accordance with example 2 of the prior art German Pat. No. 1,082,603; and (c) the soil conditioner made in accordance with example 8 below of the present invention. It was found that within the period of 1 year, the growth of the seedlings placed in the soil treated according to the German patent was twice that of the growth of seedlings placed in ordinary cactus soil and that, however, the growth of the seedlings placed in the soil of the present invention again exceeded by one half the growth of the plants in the soil of the German patent.

This is further illustrated in the attached drawings.

The comparative tests illustrated in the drawings were carried out during a period of 28 hours with cactus seedlings (species Cereus) which were obtained from seeds put in a germination bowl in February. The young plants (seedlings) had a height of 2 mm. and a depth (thickness) of 1 mm. and were planted in March in small pots of even size. For the tests, four seedlings of even size, which may be designated A, B, C and D, were selected, of which two each, A and B on the one hand and C and D on the other hand, belonged to the same species.

Seedlings A and C were now placed in one pot, each, of good humus-containing cactus soil. The seedlings B and D were placed in the soil prepared according to German Pat. No. 1,082,603 as indicated before. All four plants were given the same locality (southern exposure) and the same care (stale water and rain water for watering). The length and width (thickness) were measured and the results recorded.

In all cases the soil which was used in the particular instance was mixed with sand in a ratio of 1:1.

As indicated, the total time of observation was 24 months. The values obtained for the growth are listed in FIG. 1 in relation to time. The indicated height *a* means that the particular seedling at 1 had the height *a* and at 10 had the height 10*a*, etc., depending on the time. The indicated time intervals are intervals of two months. As appears, the first evaluations were made in February.

Figure 1:
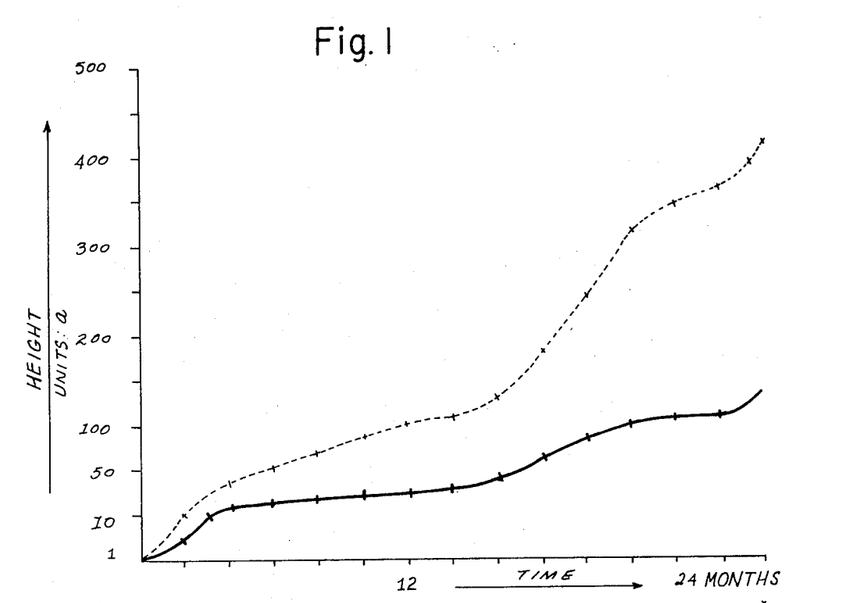
FIG. 1 illustrates the growth of plants of which two were placed in normal soil and another group of two was placed in a soil as indicated, the growths plotted against time expressed in months.
Figure 2:
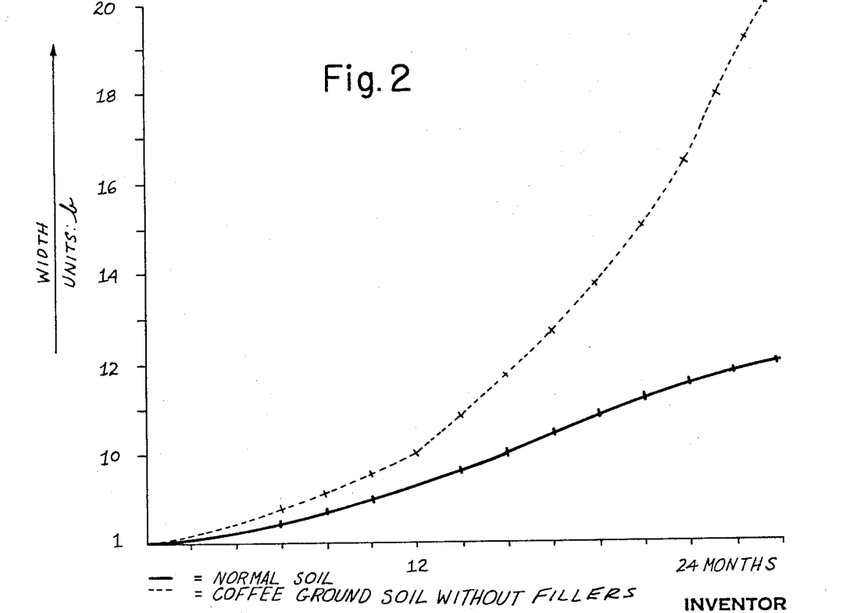
FIG. 2 shows the same except that in this case the width or thickness is plotted against time.

FIG. 2 has exactly the same meaning as FIG. 1 but illustrates the increase in width or thickness. The units in this case are identified as *b*.

For another test scions were obtained from the plants used in the tests which formed the basis of the graphs in FIGS. 1 and 2. These scions were placed in two pots which were again filled with soil and sand in a ratio of 1:1. Two scions were taken from plant B used in the first place and one scion was taken from the same plant but placed in another pot. In one pot the soil was again that described in the German Pat. No. 1,082,603 and further identified above. In the other pot a processed coffee ground extraction residue, together with fillers, was used as described in example 8. This soil, in addition, contained a small amount of polyethyleneimine.

Figure 3:
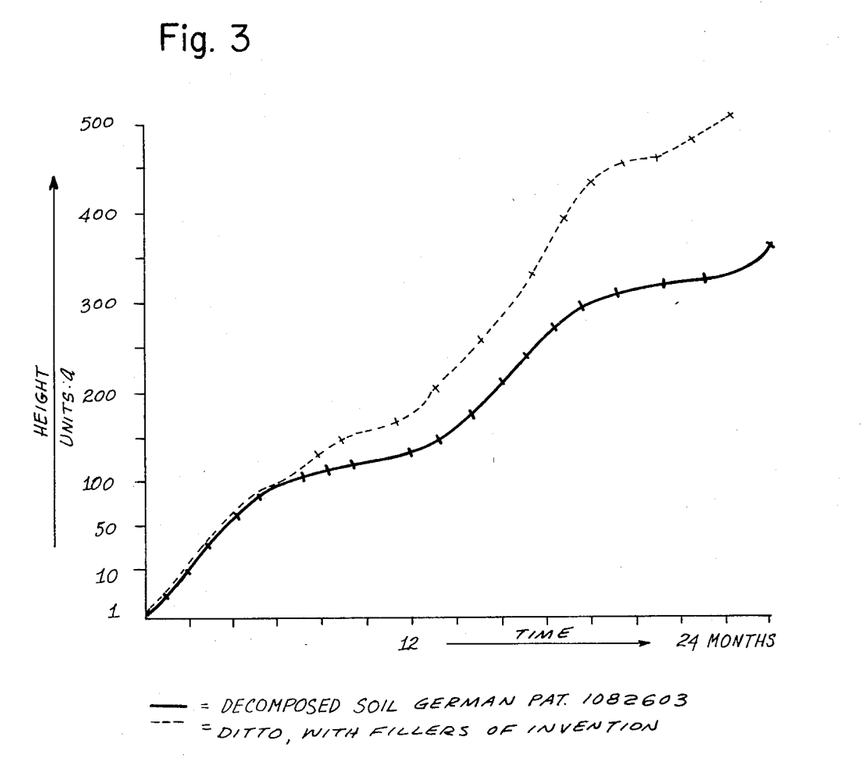
FIG. 3 shows the growth of plants in the form of scions taken from the plants used in establishing the graphs of FIGS. 1 and 2, the plants in this case placed in special soils as indicated.

Only the growth in height was then recorded in a graph as against the time expired and was listed as appears from FIG. 3.

These curves then indicate the change in height growth and thickness growth as dependent upon the particular soil. It will be understood that this kind of test arrangement can be duplicated for all kinds of plants in well controllable time periods. In case of leaf plants it is advisable to measure both the circumference of the stem, and height and the size of the leaves in order to obtain the proper statistical results.

The same tests as depicted in FIGS. 1–3 were carried out also with geraniums which exhibited a particularly surprising growth Araceae–Philodendron, Scindapsus, Calla–and Bromeliaceae); furthermore, tests were made with corn, grass and grain covering a period of a year. The leaf color, the growth of the leaves and the blossoms in the inventive soil had a particularly vigorous appearance. It seems that the chelate formation which is necessary for the growth and the chlorophyll formation takes place in an intensified manner through not-yet-determined reactions.

After a full year, it was found that the soil provided by the composition of the invention still had a firm, though porous and friable, structure. Even the continuous watering with water which was not particularly softened did not cause any bulb calcification, but the separated calcium was deposited in the cavities and in the nondigestible cell particles of the coffee grounds and did not interfere with the growth of the plants.

In summary, the compositions of the invention incorporating the fillers as described exhibit a long-lasting friable structure and can be mixed in any desired ratio with sand, clay, loam, earth, etc., and can even be spread on nutrient deficient soils and mixed with such soils in which case they still have a growth-promoting and generally soil-improving property. Particularly good results were obtained by mixing of the compositions with clay minerals, particularly montmorillonites. The friable and humus-rich property of the soil existed still after several years and continuing even growth of the plants.

A particularly advantageous use of the compositions is in the planting of deficient soil deposits, for instance embankments of superhighways, further in the cultivation of desert-like regions which may even have salt-containing sand as for instance in the area of the Dead Sea. The soil conditioners, in this case, will form a hard crust in an emulsified form with the sand without losing their growth promoting properties.

The following table gives a general picture of the treatment of the soil which should be used as background for the subsequent examples which describe the specific additions of fillers and specific operation steps of the invention. The table lists the general steps and additives associated with each of the conversion stages of the process.

TABLE

Illustrating a conversion run starting from the time of storing of the green bean up to the formation of a humus fertilizer concentrate.

Preliminary Stage

First Fermentation
- a. fermentation of coffee beans (decomposition of tannius to form soluble tannin compounds)
- b. drying
- c. roasting at 110°–140° C.
- d. grinding
- e. extracting
- f. separation of the coffee ground crude product (the pretreated waste product as received from the supply source) from the extract First Main Stage
Decomposition
Decomposition by softening in sodium carbonate or sodium hydroxide solution, 1.5–2 kg. potash in 20–30 l. $H_2O$; total amount of material 100 kg.
- a. saccharification of the starch
- b. conversion of the tannic acid materials
- c. hydrolysis of the proteins
- d. saponification of the free fatty acids (thereby reducing the surface tension and wetting of the particles).

II. Second Main Stage
2nd Fermentation
Addition of chemicals according to German Pat No. 1,082,603, example 2, or of the following:
- a. urease, 1 g. per ton, or soy bean flour or jack bean flour and/or
- b. amylase, 1 g. per ton or yeast (waste product from beer brewing), liquid dung, bacillus subtilis, Aspergillus oxycae, soy beans, mushrooms, Rhizopus Mucor-types
- c. earth, humus soil, decayed plant fragments;

d. fossil organic materials: lignite, oils, etc., containing acetic acid, ratio 1:100, heating to 40° for 5 to 12 hours.

III. Third Main Stage
  Interruption of the Fermentation
  Drying down to 50 percent water content.

IV. Fourth Main Stage
  Ripening during storing and packing
  Wetting so as to have a water content of about 70 percent
    a. storing in the form of a mass product in a cool and airy environment
    b. in case of soil for flowerpots, storing in partly closed containers.

The following examples will further explain the method of the invention for making the described compositions. These examples are to a large extent based on the general reaction conditions listed in the above table.

EXAMPLE 1

One thousand kilograms of wet coffee grounds (this example was carried out both with bean coffee and cereal Ersatz coffee) as obtained in the powdered coffee manufacture were mixed with 10 kg. of ordinary earth. The mixture was then filled into a stainless steel container and left in it up until mold had been formed. The mass was then again thoroughly mixed and, in addition, mixed with a precipitated silicic acid in an amount of 1 percent by weight relative to the total weight of the initial crude product. To this mass there was then added acetic acid water (about 20 g. of pure acetic acid in 1 liter $H_2O$) by simply pouring the liquid over the mass and effecting an even wetting thereof. Subsequently there were added about 2 percent by weight of acrolein gel.

The mass was then stored in the open air for about 4 weeks but was occasionally watered. The storing was effected in a space which was not particularly dry. There was thus obtained a product which could be mixed with soil or garden mold and constituted an excellent soil for flowerpots.

EXAMPLE 2

Ten kg. of dried coffee grounds were mixed with 0.5 kg. of a calcium silicate obtained by wet precipitation and were then stirred with water to form a highly viscous slurry. To this slurry there were subsequently added 100 cc. of ammonia water, 10 g. of thiourea and 10 g. of iron filings or iron powder.

The mixture was then subjected to a temperature of 25° C. in a closed container and was left standing for about 10 days. After opening of the container the mass had the typical odor of duck feces.

Ten g. of ammonium acetate were then added to the mass and thoroughly mixed therewith. The mass was then permitted to dry in the open air. After drying there were added 2 kg. of loam or clay and 1 percent by weight of alginate. The total mass was again subjected to thorough mixture and was again wetted. The final soil was stored in a slightly humid condition in a dark area.

There was thus obtained an excellent substrate for mushroom growing which could well replace the conventional horse dung.

EXAMPLE 3

One thousand kilograms of freshly obtained coffee grounds were mixed with 100 g. of a suspension obtained directly by the precipitation of $SiO_2$. The mixture was effected in an open stirring apparatus and was subsequently permitted to flow into a sedimentation basin where the mass was left for 5 days with access of air. The liquid then formed on top of the mass was permitted to drain and the ground sediment was dried in the open air.

The well dried sludge was then pressed into large cakes which could be used like peat as fertilizer and soil conditioner. In this case the conversion proper took place in the soil itself.

In order to have a fertilizer which could be used for grass planting of slopes, for instance of street embankments, and which had to be dry to a large extent, there was used in another test, instead of the precipitated suspension an additive consisting of 10 kg. dry silicic acid powder to which were added 10–30 kg. of lime. These additives were added to the slurrylike coffee grounds. In this case an extended drying period was not necessary.

EXAMPLE 4

One hundred kilograms of an oil cake which was obtained as the press residue in the recovery of sunflower, rape, linseed and beechnut oil was heated on a flat tray to a temperature somewhere between 100° and 250° C. The heating step could be omitted if heating had taken place during the oil recovery. The mass was then comminuted and mixed with 1 kg. of a mixture in equal parts of silicic acid and activated carbon black. Ten kilograms of ammonia water were then added. Instead, there could also be used the same amount of sewage water-containing urea such as is obtained in a sewage disposal plant. There were then furthermore added 10 kg. of farming soil and 1 kg. of the soil formed in Example 1 and the total mass was subjected again to thorough mixing. Instead of the soil of Example 1, the soil of Example 2 or Example 3 could also have been used.

This mixture was then placed in a concrete silo of the necessary size in a loose manner and was finally covered with an iron sheet to close the silo. After about 1 month the significant sweetish, unpleasant smell reminiscent of feces appeared. The fermentation was then discontinued and the mixture dried, and subsequently after a slight wetting stored in as dark a place as possible.

There was thus obtained a concentrate which, after mixing with nutrient-deficient soil or ash such as obtained in garbage burning, furnished a good soil for flowerpots.

EXAMPLE 5

Ten thousand kilograms of leaves were mixed with about 50 kg. of the product obtained in Example 1 and were then subjected to the same silo treatment as in Example 1. Instead of the leaves there were used in another test coniferous needles and in still another test an oil filtration cake as above described. The results were the same.

The decomposed products were subsequently mixed with a pulverulent mixture of hydrophobic silicic acid and water in the ratio of $SiO_2:H_2O$ of 20:80 in a total amount of about 10 percent relative to the amount of decomposed product. There was thus obtained a concentrate which preserved its humidity over an extended period of time.

EXAMPLE 6

Ten thousand kilograms of coffee grounds was mixed with 1,000 kg. of comminuted lignite waste product. In another test there were used 5,000 kg. of lignite. The initial mass was then fed batchwise into a mixer where comminuted foamed synthetics such as microporous polystyrene waste material were added as heat-storing agents. There were furthermore added as heat-generating agents calcium hydroxide and Chile saltpeter. Thereafter, 10 kg. of ammonia water was added. Instead here also could have been used the sewage liquid as is obtained in a sewage sedimentation plant which contains the same amounts of urea. The total mass was then placed in a concrete silo and covered with iron powder. The silo was then closed. Within a short time the mass heated up to between about 40° and 60° C. After about 5 days, the significant sweetish fecal smell could be noticed. The fermentation was then interrupted and the wet mixture was stored after a brief drying, in a dark place.

If it was desired in this case to obtain an acceleration of the conversion, the wetting of the raw material could also be effected with methyl alcohol or alcohol-containing sewage waters.

With reference to the table and in connection with all examples it is noted at this point that the specific addition of the fillers listed in the examples can be effected at any desired stage of the Stages I to IV as listed in the Table but that the addition in the fourth main stage is preferred.

EXAMPLE 7

Ten kilograms of a silicic acid containing filter cake such as is obtained in the treatment of oil emulsions in the metal industry, (which filter cake contains the separated oil) were mixed in a stirring vessel with 10 kg. of freshly obtained extraction residue from the manufacture of powdered coffee and 5 kg. of the product obtained according to Example 1. One hundred grams of methyl alcohol were then added and the mass was thoroughly mixed upon addition of about 30 g. of iron powder. The mixture was placed in a concrete silo and the silo was closed.

It was again opened after about 8 days and the mass was removed and dried up to a water content between 40 and 70 percent. In order to preserve the humidity, it was stored in stacks. After a storage time of about 1 month, the concentrated fertilizer was subjected to final drying, grinding and then filled in containers. It was useful then as a spray fertilizer.

After mixing with sand or earth at a ratio of 1:10 up to 5:10 an excellent garden mold was obtained.

EXAMPLE 8

The formulation of this example is particularly useful for the conversion of extraction residues from the manufacture of powdered bean coffee. However, its use is also for extraction residues from the manufacture of, for instance barley malt coffee. It is useful, in other words, wherever there are roasted seeds or fruits which have been decomposed in a hot steam extraction. However, such other beans are usually more difficult to decompose than coffee beans and the rotation periods will therefore be longer and the reaction times likewise must be extended up to a maximum of 10 days.

The formulation employed in the present example was as follows:

100 kg. of a freshly obtained extraction residue from which the water had not been separated out;

about 5 kg. of lime which could be replaced also by Thomas flour;

about 0.5 kg. of a finely divided dispersed silicic acid.

The components were intimately mixed until the mass had about the consistency of wet farming soil. Subsequently, 5 kg. of earth (such as live farming soil) were then added, and the mass was again thoroughly mixed.

The total crude mass was then placed in large iron tanks which had holes or perforations in the lower portion. ABout 50 kg. of iron powder or iron filings were added prior to closing of the tank. The tank was airtight but not pressure tight. The mass was then permitted to stand at room temperature or at a very slightly increased temperature up to about 40° C. for between 3 and 10 days. During this period the mass was subjected to one rotation per day.

After the typical fecal smell had appeared, the decomposition process was interrupted by opening of the tank and introducing air. The mass was also subjected to repeated rotations. The open tank was then permitted again to stand for 24 hours. The mass subsequently was spread in a layer about 30 cm. high on a base and was permitted to dry until the dark brown color had been changed to an almost black color. Subsequently about 500 g. of calcium formate were added and the mass which was no longer wet but still not dry to a powdery condition was placed in a flat container in loose form so as to further ripen. The mass was covered but not airtight.

After a time of between 2 and 4 hours the conversion was complete and the product, after mixing with about 30–60 weight percent of sand, loam, earth, etc., could be used as garden mold.

The processes of the above examples may be varied suitably to adapt the fertilizer and soil conditioner to different gardening, farming or forestry purposes. For instance, in connection with the fertilization of forests which recently has been more frequently undertaken, it is most important to add agents to prevent or at least control the chelating effect of the humic acids which are present in the forest soil and may also be present in the compounds of the present invention and which would tie down the essential trace elements.

The methods described in Examples 1–8 may be practiced by batchwise operations where comparatively small amounts of extraction residues have to be processed. However, recently, in view of the continuously increasing consumption of instant coffee and the resulting large amounts of extraction residues, the problem of a continuous disposal and also of a continuing exploitation of the accruing coffee grounds is very much in the foreground.

There arises therefore the specific problem to practice the decomposition or conversion of the coffee grounds in a continuous process and within comparatively short time periods. It must be borne in mind in this connection that with an average accrual of coffee grounds in a medium large operation of between 50 and 80 tons per day, a storing of the waste product in stacks is no longer possible The following example, therefore, is concerned with a continuous process for making and converting the products of the invention.

EXAMPLE 9

The process of the present example can be carried out in a continuous manner within time periods between 72 and 24 hours. The starting product in this case is a wet coffee grounds residue with a water content between 60 and 90 percent. This starting product is introduced by means of a conveyor into a mixing chamber where simultaneously the silicic acid or silicates and any desired additional additives as proposed in the present invention and disclosed above, for instance water-soluble organic polymers, microporous styrene powder, carbon black or charcoal powder and mixtures of all these products may be added. For each 100 weight parts of crude product, there should be present between 0.5 and 10 weight parts of silicic acid.

The initially very hot crude product will cool off during the transport to the mixing apparatus and therein while releasing part of the moisture. The product can therefore be subjected subsequently to a comparatively short anerobic fermentation in a putrefaction tank, for instance in a rotating tube or preferably in a putrefaction tower or column. The column is subdivided in several chambers or trays in which the product is subjected to a putrefaction operation in successive stages. By transporting the product from one to the other chamber, an overheating is avoided. When the product leaves the last chamber, it has the necessary conversion temperature of about 45°–55° C.

The anaerobic fermentation is started in the putrefaction column with exclusion of air but is then interrupted after withdrawal from the tower and continued in a decay tank which again may be a rotary tube or preferably a decay column or tower where an aerobic high-speed fermentation is effected. When the product is conveyed from the putrefaction tower to the decay tower, iron powder or iron filings are added. The decay tower preferably also consists of several floors or trays in which the product passes from the top to the bottom while air is permitted to enter and excess humidity is passed out.

The conversion process commences already in the top levels of the decay tower and increases in the subsequent levels so that after a residence time of between 48 and 24 hours the process is complete and a friable, loose product that has the smell of humus soil is delivered.

After withdrawal of the product, calcium formate is added in an amount between 0.1 and 10 percent by weight, preferably between 0.5 and 3 percent by weight. The final product has now a humidity content between 30 and 60 percent and can be filled in containers which are provided with apertures for the admission of air. Preferably the mass in said putrefaction zone is subjected to a uniform motion from its entry into the zone towards the exit from the zone while excluding air therefrom, the residence time in said putrefaction zone being up to 24 hours and the mass in said decay zone is subjected to uniform motion from the entry towards the exit of said zone while being aired, the residence time in said decay zone being up to 48 hours. The movement of the mass preferably is repeatedly interrupted in both of said zones. For instance, the movement of the mass through the putrefaction zone is interrupted between two and 12 times for periods increasing from 1 hour to 24 hours and is interrupted in its movement through the decay zone from six to 24 times for periods decreasing from 6 hours to ½ hour.

I claim:
1. A soil conditioner and garden mold comprising
   a. coffee grounds in the form of the extraction residue arising in the industrial production of powdered coffee,
   b. mineral material consisting of finely divided synthetic activated silicon dioxide or silicate or a material containing the same
   iron, powder and
   d. an alkali or earth alkali formate adapted to prevent or control the chelating effect of humic acids presents in the soil or in the soil conditioner.
2. The soil conditioner of claim 1, which includes a water-soluble or water-insoluble organic polymer adapted to store or generate heat during the decomposition of the soil conditioner the polymer being present in an amount from about 0.5 to 5 percent by weight relative to the weight of the total composition.
3. The soil conditioner and garden mold of claim 1, which includes one or more of the following:
   a. oil-containing filter cakes from metal processing or oil extraction and separation,
   b. leaves,
   c. coniferous needles.
4. The soil conditioner of claim 1, which includes carbon black or charcoal in an amount from about 0.01 to 10 percent by weight relative to the weight of the total mixture.
5. The process of making the compound of claim 1, in a continuous operation, comprising the following steps in continuous succession:
   a. moving a coffee grounds extraction residue having a humidity content of 60–90 percent into mixing zone and mixing the residue there, while in contact with air, with a finely divided synthetic activated silicon dioxide or silicate or a material containing the same;
   b. moving the mass to at least one putrefaction zone while substantially excluding air therefrom and permitting the mass to remain in said zone up to 24 hours;
   c. then moving the mass into an airable decay zone while adding iron powder thereto and permitting the mass to stay in said decay zone for a maximum of about 48 hours; and
   d. finally removing the product and mixing it with an alkali or alkali earth metal formate.
6. The soil conditioner of claim 1, in which the coffee grounds are in a putrefied condition.
7. The soil conditioner of claim 1, wherein the mineral material is wet precipitated silicon dioxide.
8. The soil conditioner of claim 1, wherein the mineral material is a precipitated or hydrothermally obtained silicate.
9. The soil conditioner of claim 1, wherein the mineral material is a pyrogenically obtained oxide of aluminum and silicon dioxide in the form of a uniform oxide or a cooxide or a coagulate or an oxide mixture.
10. The soil conditioner of claim 1, wherein the mineral material contains hydrophobic silicon dioxide.
11. The soil conditioner of claim 1, wherein the mineral material is present in an amount between about 0.5 and 30 percent by volume relative to the amount of the initial extraction residue.
12. The soil conditioner of claim 1, wherein the said agent is a sodium, potassium or calcium formate.
13. The soil conditioner of claim 1, wherein the formate is present in an amount from about 0.1 to 10 percent by weight relative to the weight of the total composition.
14. The soil conditioner of claim 1, which includes a virgin or used mineral or vegetable oil.
15. The process of claim 5, wherein comminuted organic or inorganic industrial waste products are added to the initial coffee grounds extraction residue at a ratio between extraction residue and waste product of between 100:1 and 100:20.
16. The process of claim 5, wherein the mass in said putrefaction zone is subjected to a uniform motion from its entry into the zone towards the exit from the zone while excluding air therefrom, the residence time in said putrefaction zone being up to 24 hours and wherein the mass in said decay zone is subjected to uniform motion from the entry towards the exit of said zone while being aired, the residence time in said decay zone being up to 48 hours.
17. The process of claim 5, wherein the mass is moved discontinuously through said putrefaction zone and through said decay zone.
18. The process of claim 17, wherein the movement of the mass through the putrefaction zone is interrupted between two and 12 times for periods increasing from 1 hour to 24 hours and is interrupted in its movement through the decay zone from six to 24 times for periods decreasing from 6 hours to ½ hour.

* * * * *